(12) United States Patent
Cole et al.

(10) Patent No.: US 11,935,219 B1
(45) Date of Patent: Mar. 19, 2024

(54) SYSTEMS AND METHODS FOR AUTOMATED PROPERTY DAMAGE ESTIMATIONS AND DETECTION BASED ON IMAGE ANALYSIS AND NEURAL NETWORK TRAINING

(71) Applicant: Allstate Insurance Company, Northbrook, IL (US)

(72) Inventors: Stephen Cole, Northbrook, IL (US); Keith Matera, Northbrook, IL (US); Tia Miceli, Northbrook, IL (US); Jean Utke, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 419 days.

(21) Appl. No.: 17/225,247

(22) Filed: Apr. 8, 2021

Related U.S. Application Data

(60) Provisional application No. 63/008,017, filed on Apr. 10, 2020.

(51) Int. Cl.
*G06N 3/08* (2023.01)
*G06F 18/214* (2023.01)
(Continued)

(52) U.S. Cl.
CPC .......... *G06T 7/0002* (2013.01); *G06F 18/214* (2023.01); *G06F 18/2431* (2023.01);
(Continued)

(58) Field of Classification Search
CPC ......... G06T 7/0002; G06T 2207/20081; G06T 2207/20084; G06F 18/214; G06F 18/2431;
(Continued)

(56) References Cited

U.S. PATENT DOCUMENTS 9,886,771 B1 * 2/2018 Chen .................... G06F 3/04845
9,990,661 B2 6/2018 Taylor
(Continued)

FOREIGN PATENT DOCUMENTS

KR 20130012166 A 2/2013
WO 2014150745 A1 9/2014
(Continued)

OTHER PUBLICATIONS

Najmeddine Dhieb , "A Very Deep Transfer Learning Model for Vehicle Damage Detection and Localization," Mar. 5, 2020,2019 31st International Conference on Microelectronics (ICM), pp. 158-160.*

(Continued)

*Primary Examiner* — Omar S Ismail
(74) *Attorney, Agent, or Firm* — Dinsmore & Shohl LLP

(57) ABSTRACT

Intelligent prediction systems and methods of use to train a neural network model to analyze images of property damage to detect and predict property damage of a property, the neural network model during training configured to (1) switch between one or more synthetic images comprising pixel-based masked annotations of damaged property from a synthetic engine and one or more real images comprising bounding box annotations of damaged property from a real database, and (2) freeze inactive class training to prevent learning on one or more inactive classes comprising one or more pre-determined missing annotated labels in the one or more synthetic images and/or the one or more real images.

20 Claims, 9 Drawing Sheets

(51) Int. Cl.
| | |
|---|---|
| *G06F 18/2431* | (2023.01) |
| *G06N 3/04* | (2023.01) |
| *G06Q 10/10* | (2023.01) |
| *G06Q 10/20* | (2023.01) |
| *G06Q 30/02* | (2023.01) |
| *G06Q 40/08* | (2012.01) |
| *G06T 7/00* | (2017.01) |

(52) U.S. Cl.
CPC ............... *G06N 3/04* (2013.01); *G06N 3/08* (2013.01); *G06Q 10/10* (2013.01); *G06Q 10/20* (2013.01); *G06Q 30/0278* (2013.01); *G06Q 40/08* (2013.01); *G06T 2207/20081* (2013.01); *G06T 2207/20084* (2013.01)

(58) Field of Classification Search
CPC ............ G06N 3/04; G06N 3/08; G06Q 10/10; G06Q 10/20; G06Q 30/0278; G06Q 40/08
See application file for complete search history.

(56) References Cited

U.S. PATENT DOCUMENTS

| | | | |
|---|---|---|---|
| 10,068,296 | B1 | 9/2018 | Patel et al. |
| 10,083,487 | B1 | 9/2018 | Veliche |
| 10,269,074 | B1 | 4/2019 | Patel et al. |
| 10,332,209 | B1 | 6/2019 | Brandmaier et al. |
| 2017/0221110 | A1* | 8/2017 | Sullivan ................. G06Q 10/20 |
| 2017/0293894 | A1* | 10/2017 | Taliwal .................. G06V 10/82 |
| 2018/0260793 | A1* | 9/2018 | Li ........................... G06Q 40/08 |
| 2019/0073641 | A1* | 3/2019 | Utke ..................... G06T 7/0004 |
| 2019/0095877 | A1 | 3/2019 | Li |
| 2019/0368133 | A1* | 12/2019 | Joshi ......................... G06T 7/11 |
| 2020/0143171 | A1* | 5/2020 | Lee ........................ G06V 20/49 |
| 2020/0410278 | A1* | 12/2020 | Nelson ................... G06F 18/22 |
| 2021/0150591 | A1* | 5/2021 | Gastineau ................ G06N 3/04 |

FOREIGN PATENT DOCUMENTS

| | | |
|---|---|---|
| WO | 2015175895 A1 | 11/2015 |
| WO | 2018191437 A1 | 10/2018 |
| WO | 2018196815 A1 | 11/2018 |
| WO | 2019046400 A1 | 3/2019 |

OTHER PUBLICATIONS

Kalpesh Patil, "Deep Learning Based Car Damage Classification," Jan. 18, 2018,2017 16th IEEE International Conference on Machine Learning and Applications, pp. 50-53.*

Yao Wu, "A Damage Identification System Based on Deep Learning," Mar. 20, 2020,ICIT '19: Proceedings of the 2019 7th International Conference on Information Technology: IoT and Smart City Dec. 2019, pp. 13-16.*

Xianglei Zhu,"A Unified Framework of Intelligent Vehicle Damage Assessment based on Computer Vision Technology," Mar. 12, 2020,2019 IEEE 2nd International Conference on Automation, Electronics and Electrical Engineering (AUTEEE), pp. 124-127.*

Burak Balci,"Front-View Vehicle Damage Detection using Roadway Surveillance Camera Images," 2019,In Proceedings of the 5th International Conference on Vehicle Technology and Intelligent Transport Systems (VEHITS 2019), pp. 193-197.*

Chubb Group of Insurance Companies, The chubb mobile estimate app (https://www.independentagent.com/SiteAssets/TFT/2018/Jul24/ClaimApp.pdf), Aug. 13, 2019, 2 pgs.

Car Insurance Apps—Revolutionizing the industry (http://www.schaeferautobody.com/car-insurance-apps-revolutionizing-the-industry/), Mar. 30, 2 pgs.

Neal Augenstein, Mobile app takes wait, hassle out of filing car insurance claim (https://wtop.com/news/2013/12/mobile-app-takes-wait-hassle-out-of-filing-car-insurance-claim/), Dec. 6, 2013, 2 pgs.

Srimal Jayawardena, Image based automatic vehicle damage detection (https://www.researchgate.net/publication/263619076_Image_Based_Automatic_Vehicle_Damage_Detection), Nov. 18, 2013, 199 pgs.

* cited by examiner

SYSTEMS AND METHODS FOR AUTOMATED PROPERTY DAMAGE ESTIMATIONS AND DETECTION BASED ON IMAGE ANALYSIS AND NEURAL NETWORK TRAINING

CROSS REFERENCE TO RELATED APPLICATIONS

The present disclosure claims the benefit of U.S. Provisional Application No. 63/008,017, filed Apr. 10, 2020, entitled "SYSTEMS AND METHODS FOR AUTOMATED PROPERTY DAMAGE ESTIMATIONS AND DETECTION BASED ON IMAGE ANALYSIS AND NEURAL NETWORK TRAINING," the entirety of which is incorporated herein by reference.

TECHNICAL FIELD

The present disclosure relates to automated property damage estimation prediction solutions and, in particular, systems and methods for automated predicted property damage estimations and detection based on image analysis and automated damage identification.

BACKGROUND

Insurance companies tend to generate estimates for property damage, such as home or vehicle damage, based on a manual process in which human specialists and adjusters review submitted images and information for a damaged property claim to generate an estimate. The estimate may result in a repair estimate or a total loss estimate. Accordingly, a need exists for alternative estimation solutions that automation to result in an expedited and streamlined damage prediction solutions for damaged property claims.

BRIEF SUMMARY

According to the subject matter of the present disclosure, an intelligent prediction system may include one or more processors, one or more memory components communicatively coupled to the one or more processors, and machine readable instructions stored in the one or more memory components. The machine readable instructions may cause the intelligent prediction system to perform at least the following when executed by the one or more processors: train a neural network model to analyze images of property damage to detect and predict property damage of a property, the neural network model during training configured to (1) switch between one or more synthetic images comprising pixel-based masked annotations of damaged property from a synthetic engine and one or more real images comprising bounding box annotations of damaged property from a real database. The machine readable instructions may further cause the intelligent prediction system to perform at least the following when executed by the one or more processors: (2) freeze inactive class training to prevent learning on one or more inactive classes comprising one or more pre-determined missing annotated labels in the one or more synthetic images, the one or more real images, or combinations thereof.

According to another embodiment of the present disclosure, a method of implementing an intelligent prediction system to train a neural network model to analyze images of property damage to detect and predict property damage of a property may include via the neural network model, during training, switching between one or more synthetic images comprising pixel-based masked annotations of damaged property from a synthetic engine and one or more real images comprising bounding box annotations of damaged property from a real database. The method may further include freezing inactive class training to prevent learning on one or more inactive classes comprising one or more pre-determined missing annotated labels in the one or more synthetic images, the one or more real images, or combinations thereof.

According to yet another embodiment of the present disclosure, a method of implementing an intelligent prediction system to train a neural network model to analyze images of property damage to detect and predict property damage of a property may include via the neural network model, during training, switching between one or more synthetic images comprising pixel-based masked annotations of damaged property of one or more vehicles from a synthetic engine and one or more real images comprising bounding box annotations of damaged property of the one or more vehicles from a real database. The method may further include freezing inactive class training to prevent learning on one or more inactive classes comprising one or more pre-determined missing annotated labels in the one or more synthetic images, the one or more real images, or combinations thereof.

Although the concepts of the present disclosure are described herein with primary reference to a property damage prediction solution of insured property, it is contemplated that the concepts will enjoy applicability to any setting for purposes of intelligent prediction solutions, such as alternative business settings or otherwise, including and not limited to, non-insured property and/or any service type request, such as through voice, digital, online, or other like transmission technologies.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In embodiments described herein, an intelligent prediction module to implement systems and methods to generate an automated property damage estimation determination, as described in greater detail below. A property that is damaged may be determined to be a total loss if a repair cost for the damaged property exceeds a value of the property. Alternatively, if the repair cost for the damaged property is less than the value of the property, the property may be repaired. Embodiments of the present disclosure are directed to an intelligent prediction system, as described in greater detail further below, to utilize an electronic application tool to receive uploaded and labeled photographic images and/or video associated with property and damage to the property, and to use with photo analytics run on the one or more images to generate an automated property damage estimation determination. In an embodiment, the property may be an automotive vehicle involved in an accident and may belong to either an insured party or a claimant of an insurance claim.

Figure 1:
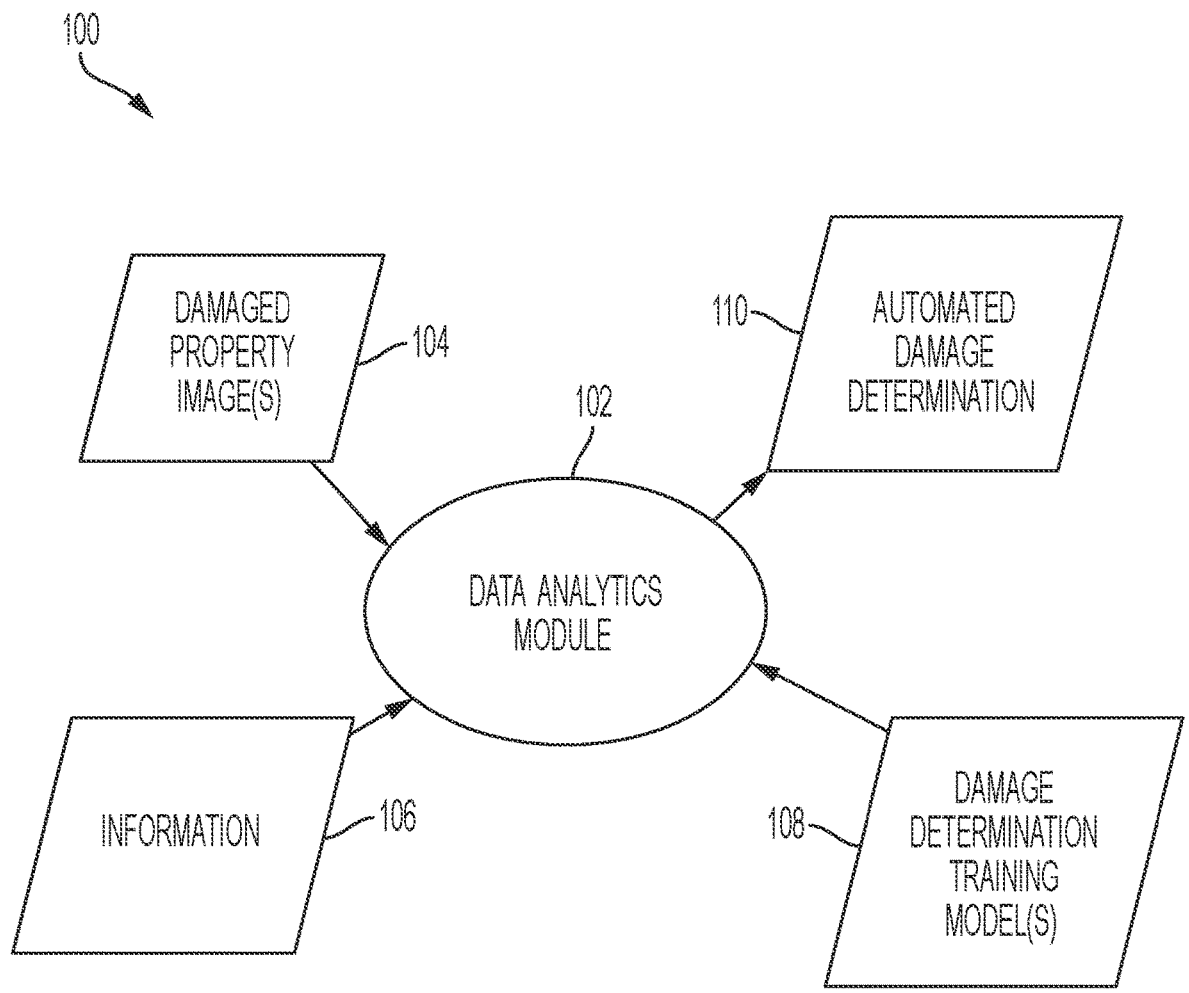
FIG. 1 illustrates an intelligent prediction solution utilizing data analytics module, according to one or more embodiments shown and described herein.

Referring to FIG. 1, an intelligent prediction solution 100 utilizes a data analytics module 102 to automatically generate one or more estimates for property damage of a property 151 (FIG. 2) based on processing of images of the property damage. In embodiments, the property 151 may be a vehicle, a housing unit, a commercial building unit, a rental unit, a boat, or other like property owned by a user. The vehicle may be an automotive vehicle such as a car, truck, or other like road-based vehicle. Various inputs are received by the data analytics module 102 to output an associated property damage estimate. For example, one or more images 104 of damaged property are input in the data analytics module along with information 106 about the owner and/or user of the damaged property. Such information 106 may include information associated with a claim for the property damage, such as a claim identifier, and other information associated with the property owner and/or user of the intelligent prediction solution 100.

One or more damage determination training models 108 are trained on image training sets to generate damage predictions. The data analytics module 102 applies a photo analytics model on the one or more images 104 of damaged property and information 106 about the owner and/or user using the one or more damage determination training models 108 to generate the automated damage determination 110.

The data analytics module 102 may be communicatively to a "big data" environment including a database configured to store and process large volumes of data in such an environment. The database may be, for example, a structured query language (SQL) database or a like database that may be associated with a relational database management system (RDBMS) and/or an object-relational database management system (ORDBMS). The database may be any other large-scale storage and retrieval mechanism whether a SQL, SQL including, or a non-SQL database. For example, the database may utilize one or more big data storage computer architecture solutions. Such big data storage solutions may support large data sets in a hyperscale and/or distributed computing environment, which may, for example, include a variety of servers utilizing direct-attached storage (DAS). Such database environments may include Hadoop, NoSQL, and Cassandra that may be usable as analytics engines. Thus, while SQL may be referenced herein as an example database that is used with the tool described herein, it is understood that any other such type of database capable of support large amounts of database, whether currently available or yet-to-be developed, and as understood to those of ordinary skill in the art, may be utilized with the tool described herein as well.

Figure 2:
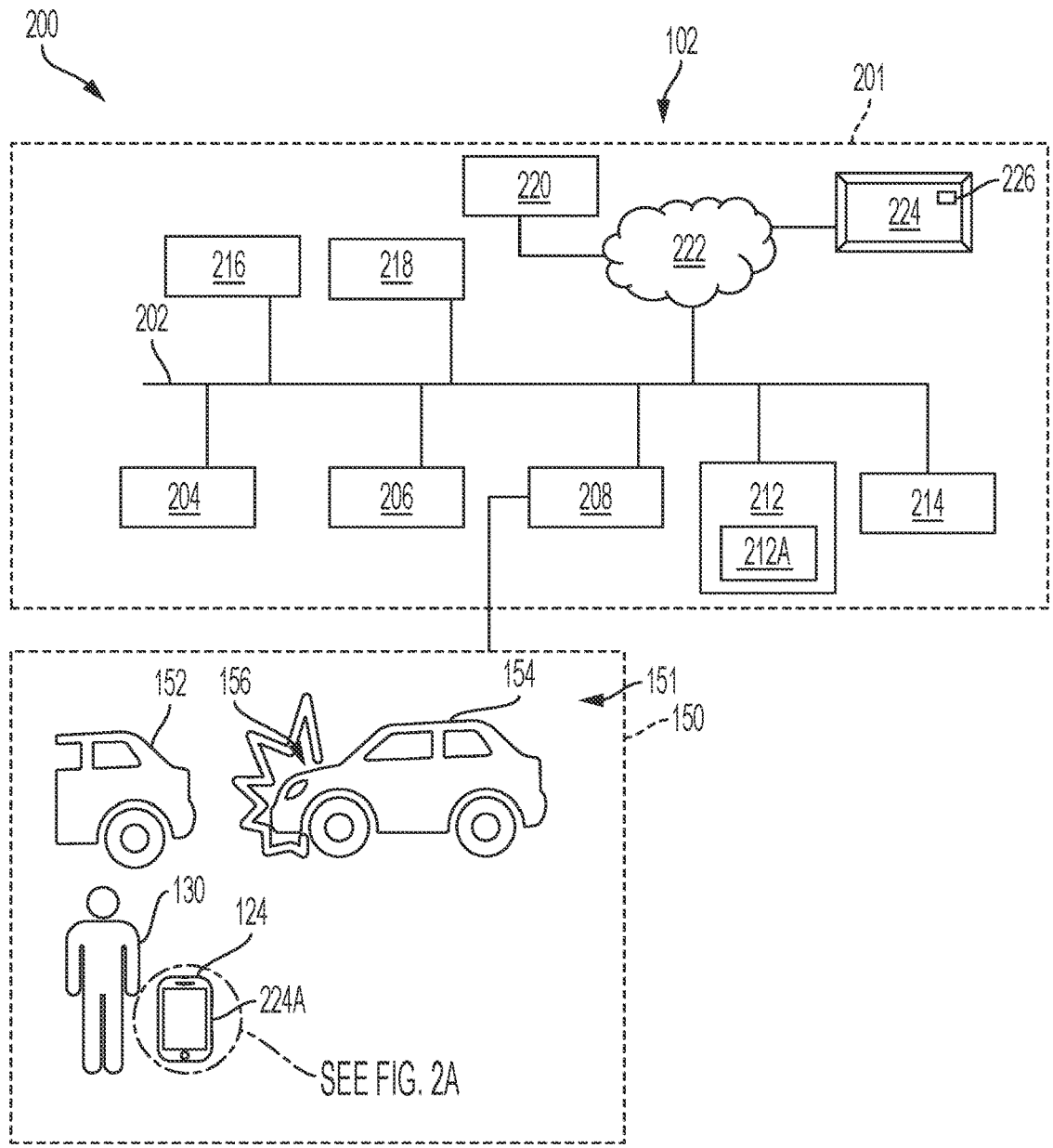
FIG. 2 illustrates a computer implemented system including an intelligent prediction module and for use with the process flows described herein and the intelligent prediction solution of FIG. 1, according to one or more embodiments shown and described herein.

FIG. 2 illustrates a computer implemented intelligent prediction system 200 for use with the processes described herein, such as processes 300 and 400 of respective FIGS. 4 and 5, as described in greater detail below. Referring to FIG. 2, a non-transitory, intelligent prediction system 200 for implementing a computer and software-based method, such as directed by the intelligent prediction solution 100 and the processes described herein, to automatically generate a property damage estimation as described herein. The intelligent prediction system 200 comprises an intelligent prediction module 201 as a component of the data analytics module 102 of FIG. 1 to generate the automated damage determination 110. The intelligent prediction system 200 further comprises a communication path 202, one or more processors 204, a non-transitory memory component 206, an image capture module 208 to receive one or more captured images, an image scoring platform 210, an image analytics module 212, an image training model module 212A of the image analytics module 212, a storage or database 214, a machine learning module 216, a network interface hardware 218, a network 222, a server 220, and a computing device 224. The various components of the intelligent prediction system 200 and the interaction thereof will be described in detail below. The image capture module 208 is configured to receive one or more images of the property damage, such as from a crash site 150. The images may be initially captured and transmitted by a user 130 through a camera 124 on a computing device 224, such as a smartphone 224A, including an application tool 226.

Figure 2A:
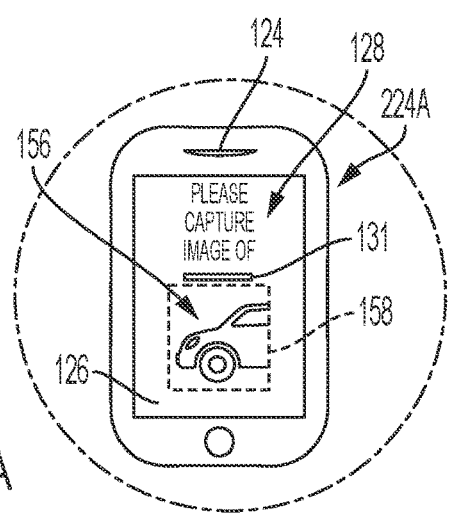
FIG. 2A illustrates a screen view for a smart mobile device of the intelligent prediction system of FIG. 2 that is configured to capture an image of damaged property, according to one or more embodiments shown and described herein.

As shown in FIG. 2A, the user 130 may capture one or more images of property damage at the crash site 150, such as of vehicles 152, 154 involved in the crash and resulting property damage 156. In an embodiment, the computing device 224 may be used to upload captured images to the intelligent prediction system 200, such as through a weblink or smart device upload. By way of example, and not as a limitation, the smartphone 224A may be used to capture one or more images 104 through use of a graphical user interface (GUI) screen 126 and the camera 124. The GUI screen 126 may include a portion with a request 128 to capture an image per an instruction 131, such as of a driver side portion of the vehicle 154 including property damage 156 within a screen capture frame 158. The property damage 156 may include areas of damage and one or more damages parts of a vehicle 154, which may associated with the user 130. The user 130 may upload the images to the image capture module 208 through the application tool 226, such as an application on the smartphone 224A or through a web-based link.

While only one server 220 and one computing device 224 is illustrated, the intelligent prediction system 200 can comprise multiple servers containing one or more applications and computing devices. In some embodiments, the intelligent prediction system 200 is implemented using a wide area network (WAN) or network 222, such as an intranet or the internet. The computing device 224 may include digital systems and other devices permitting connection to and navigation of the network. It is contemplated and within the scope of this disclosure that the computing device 224 may be a personal computer, a laptop device, a smart mobile device such as a smartphone or smart pad, or the like. Other intelligent prediction system 200 variations allowing for communication between various geographically diverse components are possible. The lines depicted in FIG. 2 indicate communication rather than physical connections between the various components.

The intelligent prediction system 200 comprises the communication path 202. The communication path 202 may be formed from any medium that is capable of transmitting a signal such as, for example, conductive wires, conductive traces, optical waveguides, or the like, or from a combination of mediums capable of transmitting signals. The communication path 202 communicatively couples the various components of the intelligent prediction system 200. As used herein, the term "communicatively coupled" means that coupled components are capable of exchanging data signals with one another such as, for example, electrical signals via conductive medium, electromagnetic signals via air, optical signals via optical waveguides, and the like.

The intelligent prediction system 200 of FIG. 2 also comprises the processor 204. The processor 204 can be any device capable of executing machine readable instructions. Accordingly, the processor 204 may be a controller, an integrated circuit, a microchip, a computer, or any other computing device. The processor 204 is communicatively coupled to the other components of the intelligent prediction system 200 by the communication path 202. Accordingly, the communication path 202 may communicatively couple any number of processors with one another, and allow the modules coupled to the communication path 202 to operate in a distributed computing environment. Specifically, each of the modules can operate as a node that may send and/or receive data.

The illustrated system 200 further comprises the memory component 206 which is coupled to the communication path 202 and communicatively coupled to the processor 204. The memory component 206 may be a non-transitory computer readable medium or non-transitory computer readable memory and may be configured as a nonvolatile computer readable medium. The memory component 206 may comprise RAM, ROM, flash memories, hard drives, or any device capable of storing machine readable instructions such that the machine readable instructions can be accessed and executed by the processor 204. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 2, as noted above, the intelligent prediction system 200 comprises the display such as a graphical user interface (GUI) on a screen of the computing device 224 for providing visual output such as, for example, information, graphical reports, messages, or a combination thereof. The display on the screen of the computing device 224 is coupled to the communication path 202 and communicatively coupled to the processor 204. Accordingly, the communication path 202 communicatively couples the display to other modules of the intelligent prediction system 200. The display can comprise any medium capable of transmitting an optical output such as, for example, a cathode ray tube, light emitting diodes, a liquid crystal display, a plasma display, or the like. Additionally, it is noted that the display or the computing device 224 can comprise at least one of the processor 204 and the memory component 206. While the intelligent prediction system 200 is illustrated as a single, integrated system in FIG. 2, in other embodiments, the systems can be independent systems.

The intelligent prediction system 200 comprises the image analytics module 212 as described above to at least apply data analytics and artificial intelligence algorithms and models to received images, and such as photographic images, and the machine learning module 216 for providing such artificial intelligence algorithms and models. The machine learning module 216 may include an artificial intelligence component to train and provide machine learning capabilities to a neural network as described herein. By way of example, and not as a limitation, a convolutional neural network (CNN) may be utilized. The image analytics module 212, the image training model module 212A, and the machine learning module 216 are coupled to the communication path 202 and communicatively coupled to the processor 204. As will be described in further detail below, the processor 204 may process the input signals received from the system modules and/or extract information from such signals.

Data stored and manipulated in the intelligent prediction system 200 as described herein is utilized by the machine learning module 216, which is able to leverage a cloud computing-based network configuration such as the cloud to apply Machine Learning and Artificial Intelligence. This machine learning application may create models that can be applied by the intelligent prediction system 200, to make it more efficient and intelligent in execution. As an example and not a limitation, the machine learning module 216 may include artificial intelligence components selected from the group consisting of an artificial intelligence engine, Bayesian inference engine, and a decision-making engine, and may have an adaptive learning engine further comprising a deep neural network learning engine.

The intelligent prediction system 200 comprises the network interface hardware 218 for communicatively coupling the intelligent prediction system 200 with a computer network such as network 222. The network interface hardware 218 is coupled to the communication path 202 such that the communication path 202 communicatively couples the network interface hardware 218 to other modules of the intelligent prediction system 200. The network interface hardware 218 can be any device capable of transmitting and/or receiving data via a wireless network. Accordingly, the network interface hardware 218 can comprise a communication transceiver for sending and/or receiving data according to any wireless communication standard. For example, the network interface hardware 218 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 2, data from various applications running on computing device 224 can be provided from the computing device 224 to the intelligent prediction system 200 via the network interface hardware 218. The computing device 224 can be any device having hardware (e.g., chipsets, processors, memory, etc.) for communicatively coupling with the network interface hardware 218 and a network 222. Specifically, the computing device 224 can comprise an input device having an antenna for communicating over one or more of the wireless computer networks described above.

The network 222 can comprise any wired and/or wireless network such as, for example, wide area networks, metropolitan area networks, the internet, an intranet, satellite networks, or the like. Accordingly, the network 222 can be utilized as a wireless access point by the computing device 224 to access one or more servers (e.g., a server 220). The server 220 and any additional servers generally comprise processors, memory, and chipset for delivering resources via the network 222. Resources can include providing, for example, processing, storage, software, and information from the server 220 to the intelligent prediction system 200 via the network 222. Additionally, it is noted that the server 220 and any additional servers can share resources with one another over the network 222 such as, for example, via the wired portion of the network, the wireless portion of the network, or combinations thereof.

Figure 3:
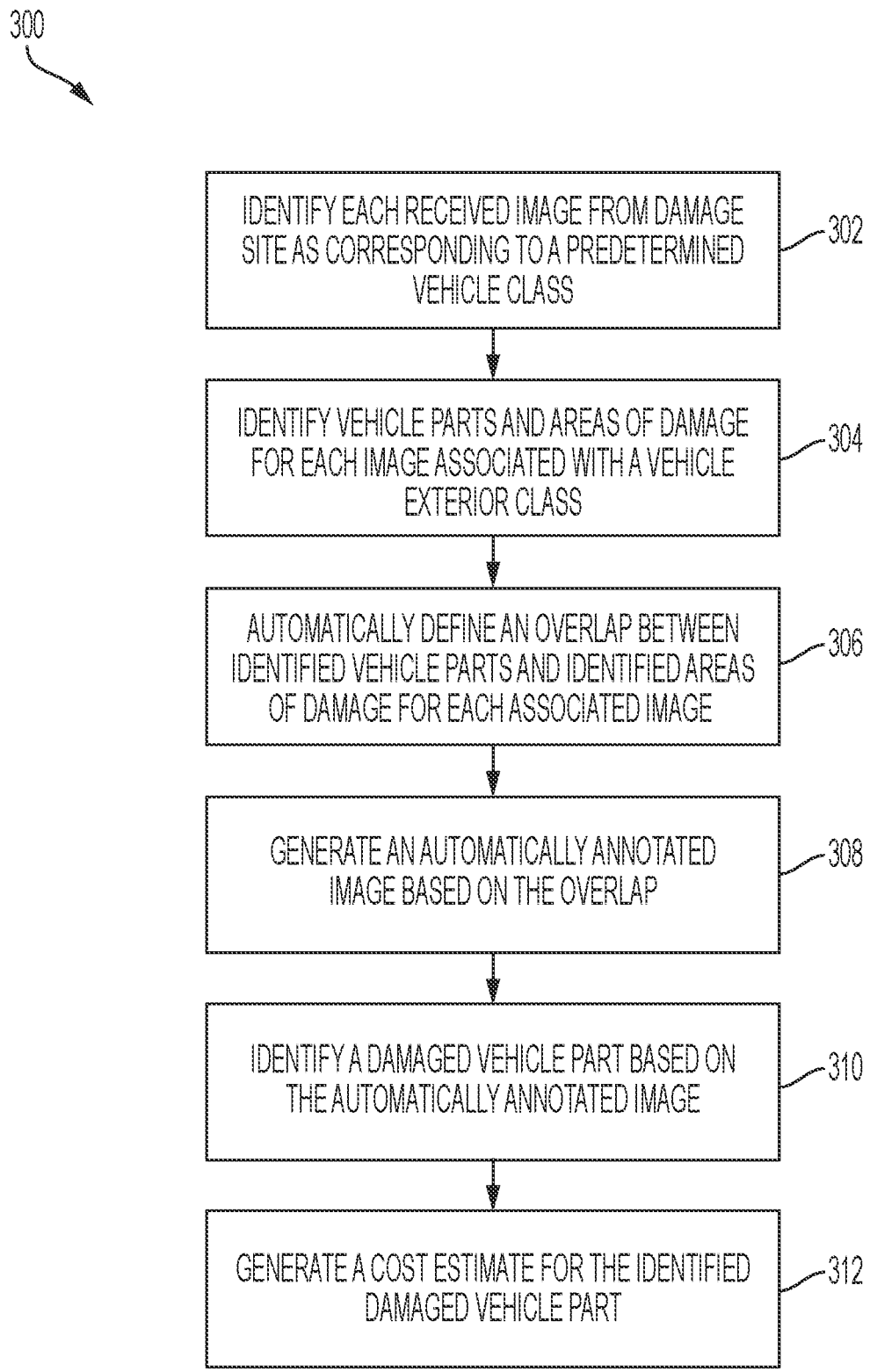
FIG. 3 illustrates a flowchart process for use of the intelligent prediction solution of FIG. 1 and intelligent prediction module and system of FIG. 2, according to one or more embodiments shown and described herein.

Referring to FIG. 3, a process 300 is shown for use with the image training model module 212A and the image analytics module 212 and the intelligent prediction system 200 of FIG. 2 to generate and predict automated property damage estimation determinations based on image analysis. In an embodiment, a user 130 may report a claim for a vehicle 154 owned by the user through a claim generation platform to generate a claim number as a claim identifier. The user 130 may further provide further information about the claim through the claim generation platform to associate with the claim identifier, which information may be retrieved by the intelligent prediction system 200. For example, the user 130 may submit information 106 about the crash site 150 such as number of vehicles included in an accident, other accident details, conditions of the vehicles involved, and the like. In embodiments, the claim generation platform utilizes a structured data model to generate a total loss score based on the information associated with the generated claim identifier.

The intelligent prediction system 200 is further configured to receives photos from the user 130 (e.g., for a vehicle the user 130 may note as "drivable") through an application tool 226, such as an app on a smartphone, of a mobile client device or through another online platform such as a weblink. The user may label uploaded photos, such as with labels including, but not limited to, "my vehicle," "accident site," "vehicle interior," or "other vehicles." For example, a photo labeled as "other vehicles" may include the vehicle 154 of the user 130 along with one or more other vehicles 152.

Photo analytics run by the image analytics module 212 on the submitted images from the application tool 226 to identify and analyze damage to the vehicle 154 of the user 130 reported in a claim, which may be generated by the claim generation platform, further may generate an automated property damage estimation determination.

In embodiments, the intelligent prediction system 200 may include the image scoring platform 210 to receive one or more captured images 104 of damaged property, which captured images 104 may be labeled as described in greater detail further below. The one or more captured images 104 may be filtered through a filter and the image scoring platform 210 to output a selection of images for further processing as one or more usable filtered images and to discard one or more determined unusable images to improve processing. The one or more usable filtered images may then be utilized for further image processing by the intelligent prediction system 200.

In embodiments described herein, the intelligent prediction system 200 is configured to instruct a user of an electronic application tool 226 to upload one or more photos 104. In block 302 of the process 300 of FIG. 3, images uploaded by the user 130 from the damage site (e.g., the crash site 150) through such an application tool 226 are received by the intelligent prediction system 200, and each received image from the damage site is identified as corresponding to a predetermined vehicle class. The intelligent prediction system 200 may request certain class images for submission through the application tool 226 of a smartphone 224A, for example, by the user 130. As a non-limiting example, the user 130 may be guided to submit vehicle images of the following classes: corner images of each of the four corners, a vehicle identification number (YIN) image, an odometry image, and three images of damaged areas of the vehicle 152, 154. The intelligent prediction system 200 may then analyze the submitted images through a photo analytics model of the image analytics module 212 of the data analytics module 102 to act as an automated specialist and to authenticate and/or score the submitted images. The intelligent prediction system 200 may further identify image content with respect to a variety of predetermined classes, such as vehicle corner(s), front, rear, side, interior, and the like. In embodiments, the submitted images 104 may or may not be labeled.

In block 304, the intelligent prediction system 200 may use the images 104 to identify vehicle parts and areas of damage for each image 104 associated with a predetermined class of an exterior of the vehicle 152, 154. In block 306, the intelligent prediction system 200 automatically defines an overlap between the identified vehicle parts and identified areas of damage for each associated image 104. Based on this automatically defined overlap, in block 308, an automatically annotated image is generated annotated image the defined overlap. In block 310, a damaged vehicle part is identified based on the automatically annotated image and the defined overlap.

In embodiments, the intelligent prediction system 200 may aggregate the images 104 processed through blocks 302-310 and the image analytics module 212 and look up information regarding the one or more identified damages part in, for example, a database. In block 312, the intelligent prediction system 20 may then generate a cost estimate for the one or more identified damaged vehicle parts. The cost estimate, as an estimated cost of repair, may be used to prepopulate an estimate as the generated automated property damage estimation determination.

Figure 4:
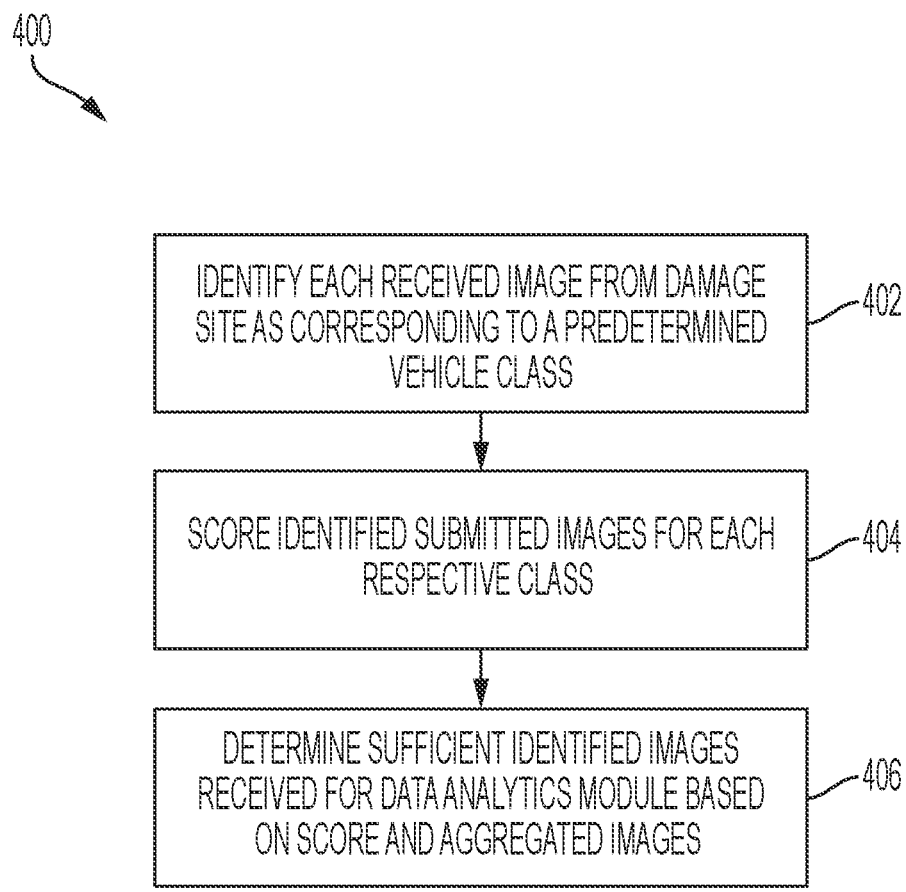
FIG. 4 illustrates another flowchart process for use of the intelligent prediction solution of FIG. 1 and intelligent prediction module and system of FIG. 2, according to one or more embodiments shown and described herein.

Referring to FIG. 4, a process 400 is shown for use with the image training model module 212A and the image analytics module 212 and the intelligent prediction system 200 of FIG. 2 to generate and predict automated property damage estimation determinations based on image analysis. In embodiments described herein, the intelligent prediction system 200 is configured to instruct a user of an electronic application tool 226 to upload one or more photos 104 in a guided manner via one or more instructions 131 as described above. In block 402, each received image 104 from a damage site (e.g., the crash site 150) is identified as corresponding to a predetermined class similar to the block 302 of FIG. 3. In block 404, each identified submitted image 104 for each respective class is scored. Each score may be applied to the images 104 to indicate image quality and/or the intelligent prediction system 200 may determine that a sufficient amount of validated images 104 of the requested classes and/or of sufficient quality have been submitted to generate acceptable images 104 for further image processing and analysis via the image analytics module 212. In block 406, an identified amount of images 104 received for the data analytics module 102 may thus be determined to be sufficient based on the score and aggregated images for further processing. Such processing may occur through, for example, returning to blocks 304-312 of the process 300 of FIG. 3.

In an embodiment, the intelligent prediction system 200 may include machine readable instructions stored in a memory component 206 communicatively coupled to a processor 204. Similar to the process 300 of FIG. 3, the machine readable instructions may cause the intelligent prediction system 200 to perform at least the following when executed by the processor 204: receive from the user 130 one or more uploaded images 104 of at least the property 151. In embodiments, the one or more uploaded images 104 may be provided by the user 130 based on one or more instructions 131 as guidance regarding view of the property 151 to be captured in the one or more uploaded images 104. The machine readable instructions may further cause the intelligent prediction system 200 to perform at least the following when executed by the processor 204: identify each received image 104 as corresponding to at least one predetermined class, identify a property part for each received image 104 associated with the at least one predetermined class defining an exterior portion of the property 151, identify an area of damage for each received image associated with the at least one predetermined class defining the exterior portion of the property 151, automatically define an overlap between a part mask associated with the identified property part and a damage mask associated with the identified area of damage for each received image associated with the at least one predetermined class defining the exterior portion of the property 151, generate an automatically annotated image based on the overlap in which an annotation is disposed to surround the overlap as a damaged part mask, identify a damaged property part based on the automatically annotated image and the damaged mask, and generate an automated damage estimation determination based on the identified damaged property part.

In embodiments, the property 151 may include a vehicle 152, 154. Further, the property part may include a vehicle part, the at least one predetermined class may include a predetermined vehicle class, the exterior portion of the property may include the exterior portion of the vehicle, the identified property part may include an identified vehicle part, and the damaged property part may include a damaged vehicle part. The vehicle may be an automotive vehicle. The property 151 may include property of the user 130, who may an insured or a person other than the insured such as another claimant.

Further, the one or more uploaded images 104 may include one of the following predetermined classes of the property: front, rear, driver side, passenger side, and interior, or combinations thereof. In an embodiment, the one or more uploaded images 104 are configured to be labeled based on one or more predetermined classes, which may be one of front, rear, driver side, passenger side, driver side front corner, passenger side front corner, driver side rear corner, passenger side rear corner, zoomed in, and not vehicle. When the one or more predetermined classes is driver side front corner, the one or more predetermined classes further includes a sub-class of front visible, driver side visible, or front and driver side visible. When the one or more predetermined classes is passenger side front corner, the one or more predetermined classes further includes a sub-class of front visible, passenger side visible, or front and passenger side visible. When the one or more predetermined classes is driver side rear corner, the one or more predetermined classes further includes a sub-class of rear visible, driver side visible, or rear and driver side visible. When the one or more predetermined classes is passenger side rear corner, the one or more predetermined classes further includes a sub-class of rear visible, passenger side visible, or rear and passenger side visible.

The machine readable instructions may further cause the intelligent prediction system 200 to, when executed by the processor 204, score via the image scoring module 210 at least one region of interest of each of the identified received images 104 for each corresponding at least one predetermined class, and determine whether a sufficient amount of identified received images 104 are received for further processing by the data analytics module 102 to generate the automated damage estimation determination based on the score. By way of example, and not as a limitation, each score may apply a value to the image quality of each identified received image 104. Additionally or alternatively, each score may apply a value to an amount of validated images 104 of certain requested classes and/or sufficient quality being received such that an amount of acceptable images 104 is generated for further imaging processing and analysis.

The instructions may further be to retrieve information based on the claim identifier. Such information may include a reported property type of the property 151 already reported to and stored within the claim generation platform or other component of the intelligent prediction system 200. Such information may further include damage details of the property 151 and an age of the property 151.

In embodiments, the intelligent prediction system 200 may analyze submitted images, which may be partially or fully unlabeled, through artificial intelligence that is trained on a neural network configured to (1) switch between synthetic images comprising pixel-based masked annotations of damaged property from a synthetic engine and real images comprising bounding box annotations of damaged property from a real database and (2) freeze inactive class training to prevent learning on one or more inactive classes comprising one or more pre-determined missing annotated labels in the one or more synthetic images, the one or more real images, or combinations thereof. The real images may be annotated with bounding boxes disposed around damaged parts to identify damaged areas, as shown in real image 712 of FIG. 7. The synthetic engine may correspond to a synthetic database comprising one or more synthetic images, while the real database comprises one or more real images. Such synthetic engines may include 3D simulation engines. In an embodiment, such synthetic engines may be the UNREAL ENGINE as available by Epic Games, Inc. of Cary, North Carolina, or can include other engines generating other synthetic data. The systems and methods described herein are not limited in this regard.

Figure 5:
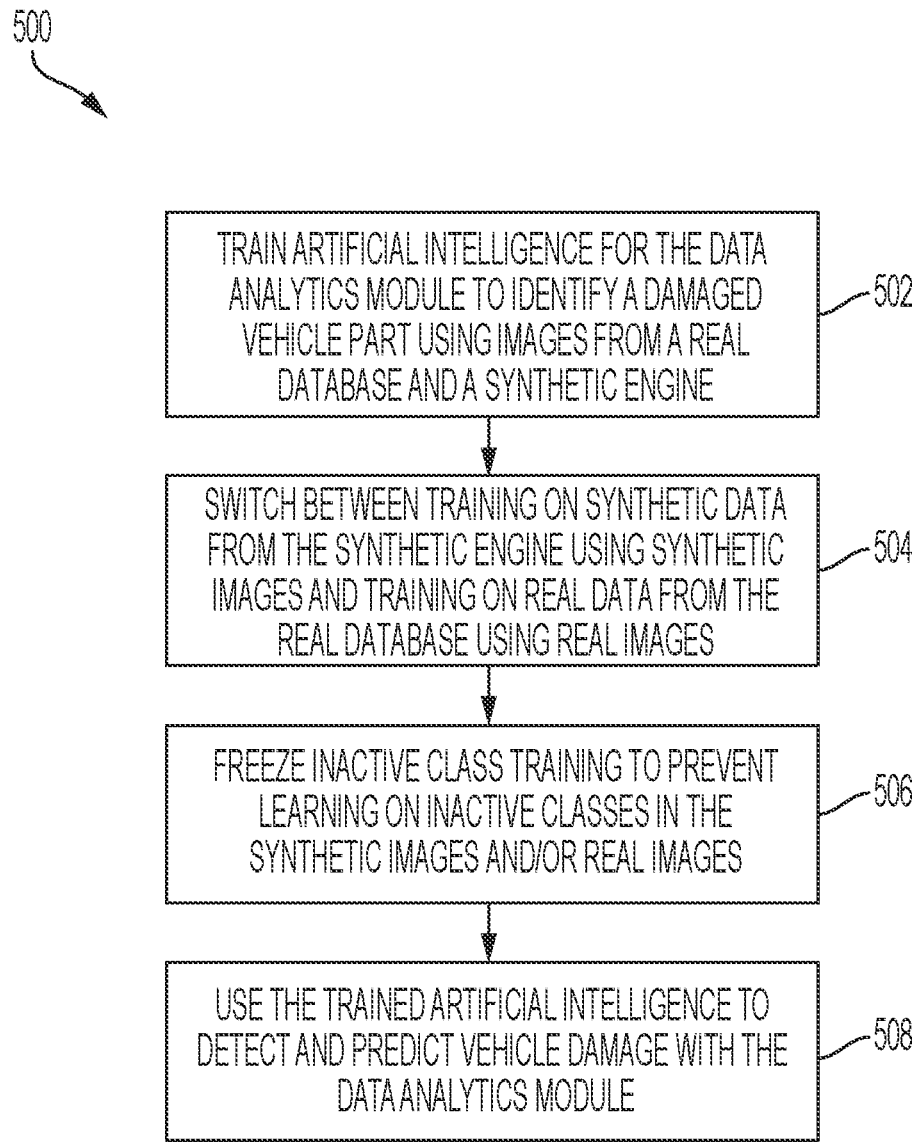
FIG. 5 illustrates another flowchart process for use of the intelligent prediction solution of FIG. 1 and intelligent prediction module and system of FIG. 2 along with a neural network switch and freeze function, according to one or more embodiments shown and described herein.

Referring to FIG. 5, a process 500 is shown for use with the image training model module 212A and the image analytics module 212 and the intelligent prediction system 200 of FIG. 2 to generate and predict automated property damage estimation determinations based on image analysis and a neural network switch and freeze function. In block 502, artificial intelligence is trained for the data analytics module 102 to identify a damaged vehicle part using images from a real database and a synthetic engine. In embodiments, the synthetic engine as an unreal engine is or is a modification of a video game engine configured to run simulations and generate masks with respect to underlying components of an image.

In block 504, the intelligent prediction system 200 when training the artificial intelligence for the data analytics module 102 is configured to switch between training synthetic data using synthetic images comprising pixel-based masked annotations of damaged property from the synthetic engine and training real data using real images of, for example, damaged vehicles, the real images comprising bounding box annotations of damaged property from the real database.

In block 506, inactive class training to prevent learning on one or more inactive classes comprising one or more pre-determined missing annotated labels in the real image(s) from the real database and the synthetic image(s) from the synthetic engine is frozen. Thus, as a non-limiting example, the neural network model will not learn an accuracy from a missing label, such as an inaccurate learning that a car may not include a bumper if a bumper label is missing from an image. As much of real data may only have damage labeled while vehicles and parts are present in an image, an ability to ignore classes that may be unlabeled in real data may allow for the model to not learn that unlabeled vehicles are not vehicles via the inactive class training. Thus, unlabeled vehicles may still be recognized and/or learned as being vehicles in an image. With respect to such freezing, an a non-limiting example, at times the neural network model using real data does not learn about vehicles while the neural network model using synthetic data learns about vehicles, while at other times the neural network model using real data does learn about vehicles while the neural network model using synthetic data does not learn about vehicles. The neural network model using synthetic (e.g., unreal) data may be trained on an unreal video game engine 720 (FIG. 7) and may identify an outline mask 724 of a vehicle and an outline mask 824 (e.g., masks 824A-824C of FIGS. 8A-8C) of damage to the vehicle. Thus, the masks may include an outline of the vehicle and one or more outlines of damage areas of the vehicle. The neural network model using real data may be trained on a real database 710 and may include images provided with pre-annotated bounding box 714 areas for training.

Thus, between blocks 504 and 506, the intelligent prediction system 200 implements a neural network switch and freeze function to train between and on real data of real images of vehicle damage from the real database and synthetic data of masked images of vehicle damage from the synthetic engine. In block 508, the trained artificial intelligence is used to detect and predict vehicle damage in one or more images of damages vehicles with the data analytics modules 102. Such hybrid training between the real data and the synthetic data allows for loss to continuation drop such that error reduces and optimization improves for the training model that is trained switching between synthetic and real data for set iterations.

Figure 7:
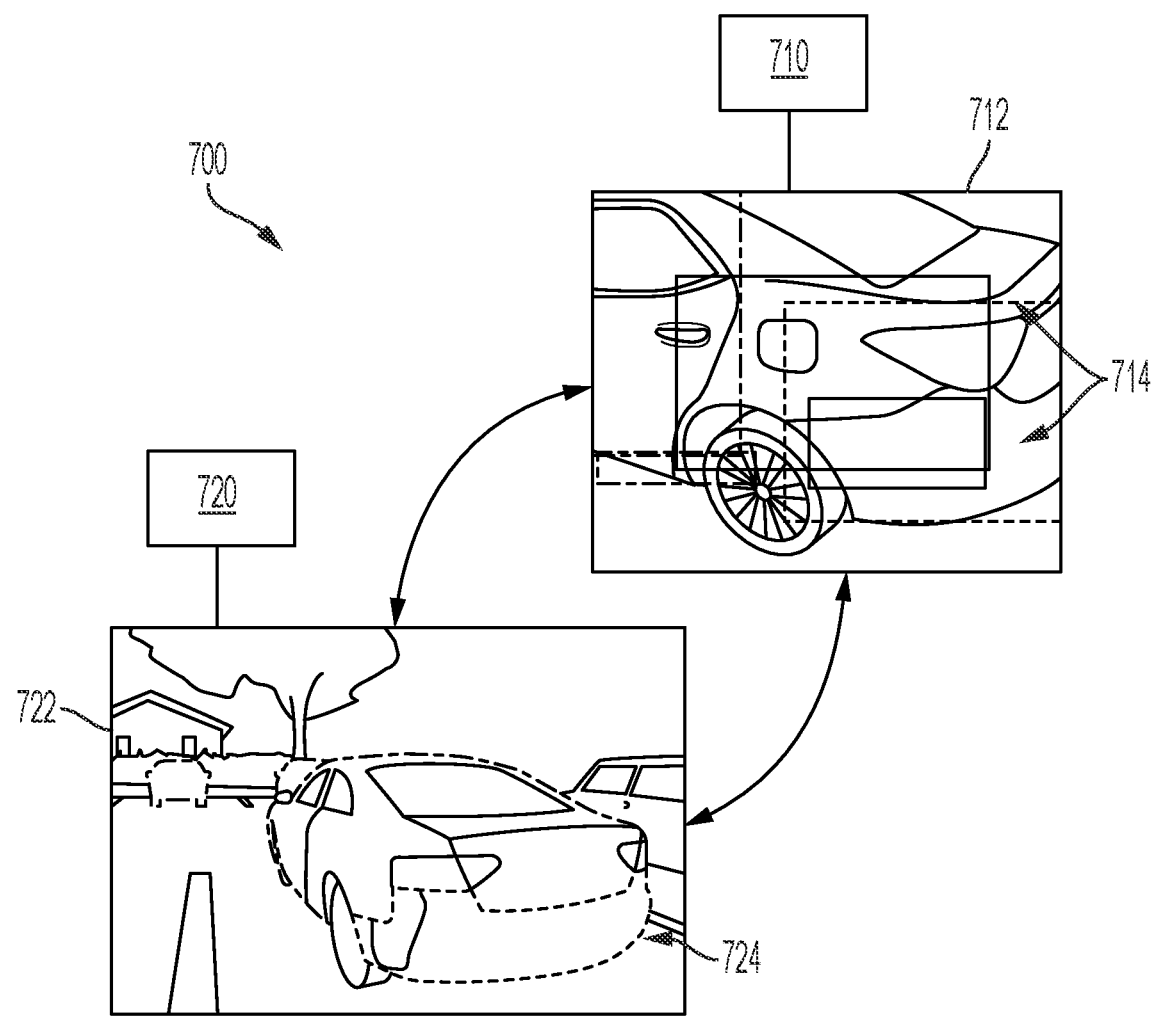
FIG. 7 illustrates a switch between a real database image view of a vehicle and a synthetic engine image view of a vehicle with a neural network as applied to the intelligent prediction solution of FIG. 1 and intelligent prediction module and system of FIG. 2, according to one or more embodiments shown and described herein.

Referring to FIG. 7, a switch 700 is shown between a real database image view 712 of a vehicle utilizing the real database 710 and a synthetic engine image view 722 of a vehicle utilizing the synthetic engine 520 with a neural network as applied to the intelligent prediction solution of FIG. 1 and intelligent prediction module and system of FIG. 2. Synthetic data may be generated and superimposed on one or more images or videos of a vehicle with data related to timing and cameraperson position available. The synthetic data may be configured to be applied to the vehicle of an image to predict an area of damage to exterior surfaces of the vehicle, and the parts and damage of the vehicle may be identified at a pixel level in the image. A mask may be applied to a region of an image as an outline annotation to suggest where to predict an area of damage, as, for example, a prediction by the intelligent prediction system 200 of what a boundary box should encompass as a damaged vehicle part. Further, lighting, resolution, and angle of an image may be parameters affecting how well a mask is disposed on the image over the predicted area of damage. By way of example, and not as a limitation, a left rear quarter panel of the vehicle may have a first superimposed part box, a left rear door area of the vehicle may have a second superimposed part box partially overlapping with the first superimposed part box, and an predicted area of damage may be disposed as a synthetic mask within an overlapping area of the first and second superimposed part boxes of the left rear quarter panel and the left rear door area. Further, bounding boxes with multiple vehicle parts may be used in training models and overlaid to identify specific damaged vehicle parts in images through trained hybrid models as described herein. In embodiments, such synthetic and real vehicle data may be mixed through use of the artificial intelligence trained as a single model using both synthetic and real images as described herein. Such a single model is configured to use precise masks and a quantity of images from the synthetic engine, and a small number of real images showing real damage may be utilizing in comparison to not using synthetic images for training. In embodiments, the real images may have bounding box annotations as described herein. The neural network model may learn not only a full region of pixels associated with a damaged area (e.g., synthetic data) but also learn an area a box surrounds as a damaged part (e.g., real data) and may switch between the synthetic and real data when training, such as at a 5:1 ratio or a 1:1 ratio, or may train on each individually.

A loss may be defined through a loss function as described herein that is configured to permit a mask regions with convolutional neural networks ("Mask R-CNN") to learn on real images annotated with bounding boxes alone. A new loss may make assumptions such as a bounding box completely surrounds an object instance and that the bounding is generally tight around the object instance. Pixels in the evaluated image may be assigned to a ground truth box by a first length distance, and analyzed loss types as described below may include an underestimate, an overestimate of area, and an overestimate of length.

Thus, alternatively or in addition to the process 500 of the neural network switch and loss function, a neural network loss function may be utilized to train images, decrease error, and optimizing training and damage prediction. Such a neural network loss function may be a modified loss function for the intelligent prediction system 200 utilized based on modified boundary boxes disposed about damaged areas of submitted images to assess different types of loss based on labeled images to decrease loss in and optimize damaged area predictions. The modified loss function may assume that a bounding box completely surrounds and is generated tight around a damaged part. The modified loss function may further, based on pixel determinations of the bonding box in comparison to a bounded object (e.g., the damaged part), generate overestimated and underestimated loss determinations used to decrease loss (e.g., error) in damage part detection predictions from image analysis, as described in greater detail below with respect to FIGS. 8A-9B.

The process 500 may further utilize relatively inexpensive and less sophisticated images of annotated property damage for training a neural network model to implement a more sophisticated automated property damage contouring with respect to an uploaded image and associated estimation determination. Detailed predictions (per-pixel classification) may be made with coarse labels (boxes) by designing and implementing a loss based upon relationships between the two regimes, while including prior assumptions about the nature of these relationships. By way of example, and not as a limitation, the model may assume that pixels of interest would lie within X % of the boundaries of the box (with loss steeply ramping up as one strays beyond the boundaries), and that the image could be partitioned into regions-of-interest such that each pixel belongs to exactly one bounding box, allowing the model to 'assign blame' for an incorrect prediction as being associated with a particular box. Thus, the model would not be required to require on priors concerning what specific shapes and/or area within the specific box must belong the target class (e.g., 60% of what's inside of the box must belong to the target class, and the blob should be roughly an oval).

Figure 6:
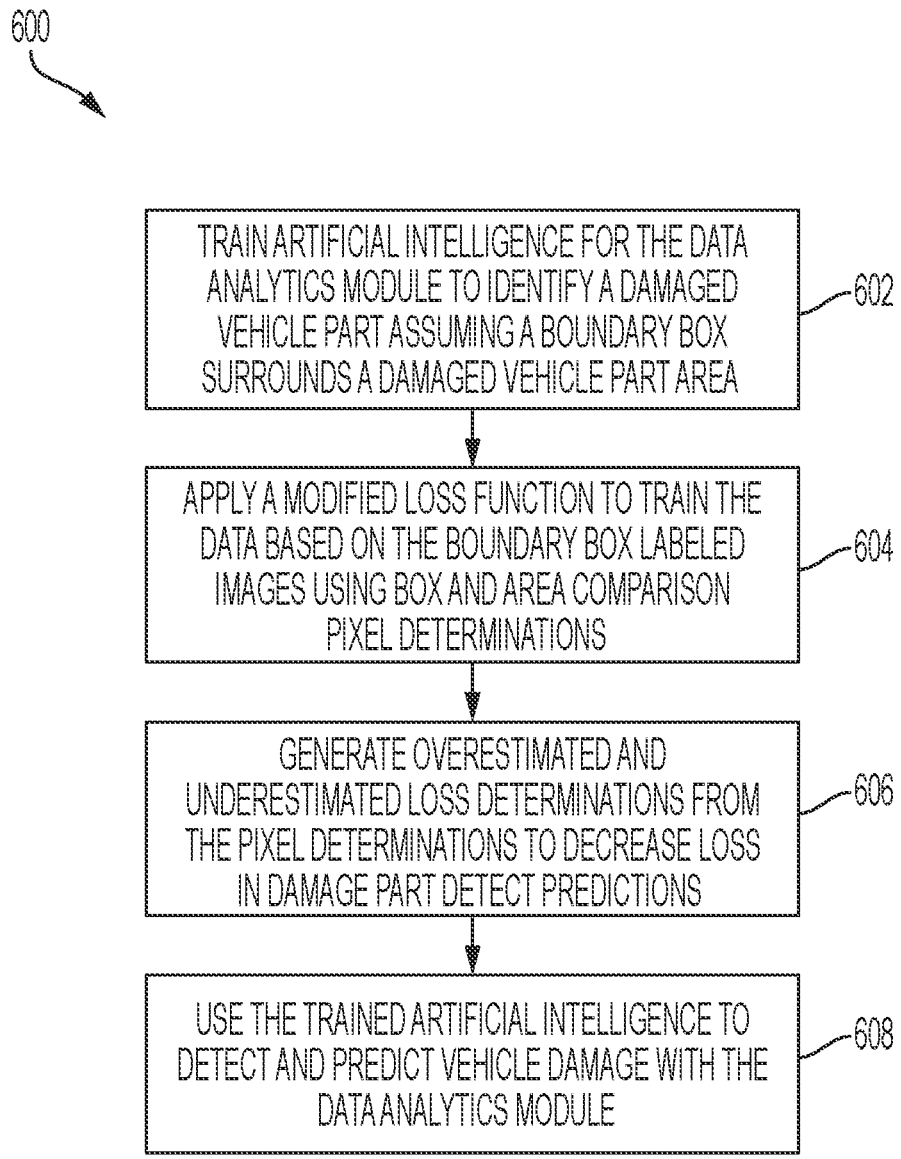
FIG. 6 illustrates another flowchart process for use of the intelligent prediction solution of FIG. 1 and intelligent prediction module and system of FIG. 2 along with a neural network loss function, according to one or more embodiments shown and described herein.

Referring to FIG. 6, a process 600 is shown for use with the image training model module 212A and the image analytics module 212 and the intelligent prediction system 200 of FIG. 2 to generate and predict automated property damage estimation determinations based on image analysis and a neural network loss function. In block 602, artificial intelligence is trained for the data analytics module 102 to identify a damaged vehicle part assuming a boundary box surrounds a damaged vehicle part area. In block 604, the modified loss function is applied to train the data based on the boundary box labeled imaged using box and area comparison pixel determinations, as described in greater detail below. In block 606, overestimated and underestimated loss determinations are generated from the pixel determinations to decrease loss in the damaged part detection predictions. In block 608, the trained artificial intelligence is used to detect and predict vehicle damage with the data analytics module 102 with respect to the analyzed and captured images 104 as described above.

Figure 8A:
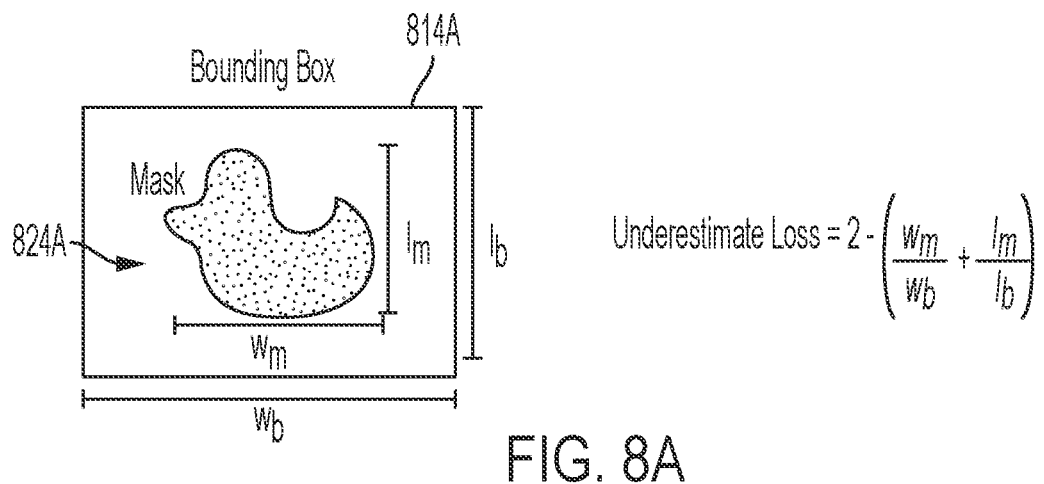
FIG. 8A illustrates an exemplary underestimate loss based on width and length of a bounding box and a mask with respect to an image and utilizing the neural network loss function of the process of FIG. 6, according to one or more embodiments shown and described herein.
Figure 8B:
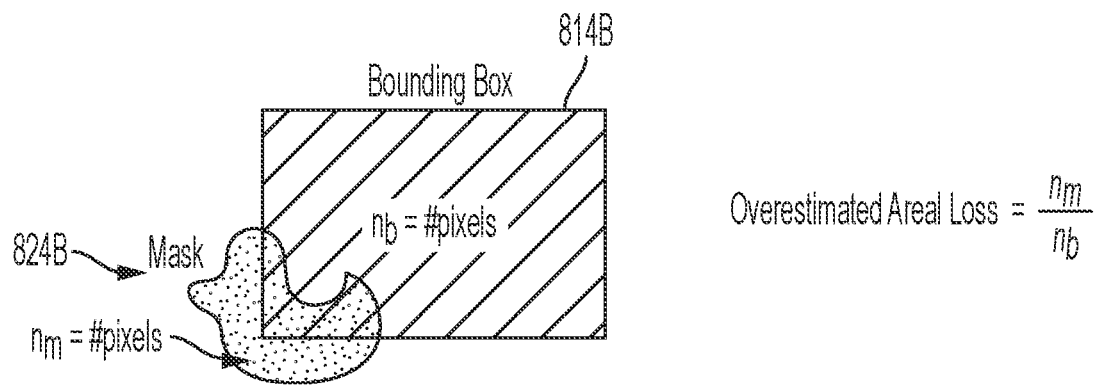
FIG. 8B illustrates an exemplary overestimate loss based on area of a bounding box and a mask with respect to an image and utilizing the neural network loss function of the process of FIG. 6, according to one or more embodiments shown and described herein.
Figure 8C:
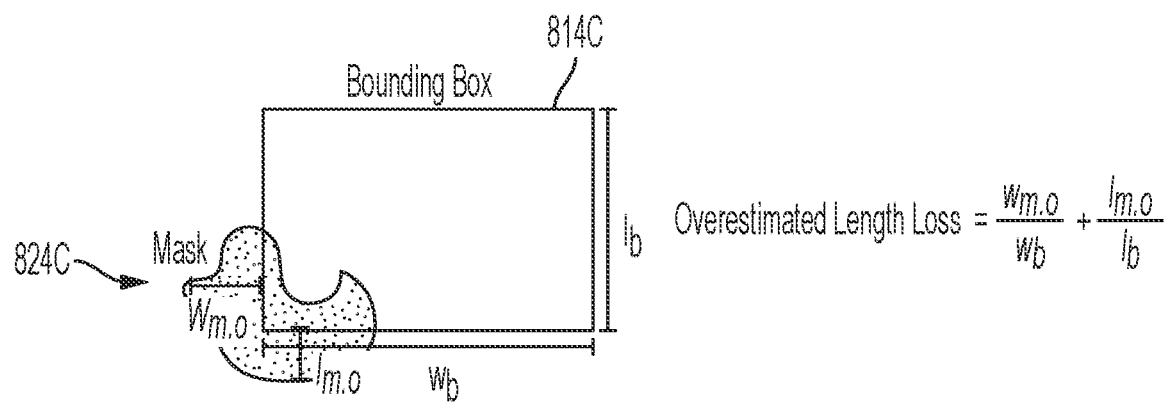
FIG. 8C illustrates an exemplary overestimate loss based on width and length of a bounding box and a mask with respect to an image and utilizing the neural network loss function of the process of FIG. 6, according to one or more embodiments shown and described herein.

FIGS. 8A-8C show non-limiting examples of the generated overestimated and underestimated loss determinations of block 606 of FIG. 6. For the loss score estimations of FIGS. 8A-8C, n is representative of area, w is representative of width, and l is representative of length. Each of FIGS. 8A, 8B, and 8C include a respective bounding box 814 (e.g., bounding boxes 814A, 814B, and 814C) and a respective mask 824 (e.g., masks 824A, 824B, 824B). Referring to FIG. 8A, an underestimate loss is shown based on width and length of a bounding box and a mask with respect to an image and utilizing the neural network loss function of the process 600 of FIG. 6. In FIG. 8A, the bounding box 814A is fully disposed about the mask 824A of a property damage area. The underestimated loss utilizes an Equation 1 disposed below:

$$\text{Underestimated Loss} = 2 - \left(\frac{w_m}{w_b} + \frac{l_m}{l_b}\right). \quad \text{(Equation 1)}$$

In Equation 1, $w_m$ is the width of the mask 824A, $w_b$ is the width of the bounding box 814A, $l_m$ is the length of the mask 824A, and $l_b$ is the length of the bounding box 814A. An underestimate loss as calculated through Equation 1 may show, for example, an amount by which the bounding box 814A is too large with respect to coverage of the mask 824A such that the bounding box 814A overly covers and may not be generally tight about the mask 824A.

Referring to FIG. 8B, an overestimate loss is shown based on area of a bounding box and a mask with respect to an image and utilizing the neural network loss function of the process 600 of FIG. 6. An area outside the bounding box 814A as generated through a pixel determination is compared to an area within the bounding box 814A. In FIG. 8A, the bounding box 814A is partially disposed about the mask 824B of a property damage area. The overestimated loss of FIG. 8B utilizes an Equation 2 disposed below:

$$\text{Overestimated Loss} = \frac{n_m}{n_b}. \quad \text{(Equation 2)}$$

In Equation 2, $n_m$ is the number of pixels of the mask 824B and outside the bounding box 814B, and $n_b$ is the number of pixels of the bounding box 814B. An overestimate loss as calculated through Equation 2 may show, for example, an amount by which the bounding box 814B is too small with respect to coverage of the mask 824B such that the mask 824B is not fully covered by the bounding box 814B.

Referring to FIG. 8C, an overestimate loss is shown based on width and length of a bounding box and a mask with respect to an image and utilizing the neural network loss function of the process 600 of FIG. 6. A length outside the bounding box 814C is compared to a length within the bounding box 814C, and a width outside the bounding box 814C is compared to a width within the bounding box 814C. In FIG. 8C, the bounding box 814C is partially disposed about the mask 824C of a property damage area. The overestimated loss of FIG. 8C utilizes an Equation 3 disposed below:

$$\text{Overestimated Loss} = \frac{w_{m \cdot o}}{w_b} + \frac{l_m \cdot o}{l_b}. \quad \text{(Equation 3)}$$

In Equation 3, $w_{m,o}$ is the width of the mask 824A outside the bounding box 814C, $w_b$ is the width of the bounding box 814A, $l_{m,o}$ is the length of the mask 824A outside the bounding box 814C, and $l_b$ is the length of the bounding box 814A. An overestimate loss as calculated through Equation 3 may show, for example, an amount by which the bounding box 814C is too small with respect to coverage of the mask 824C such that the mask 824C is not fully covered by the bounding box 814C.

Figure 9A:
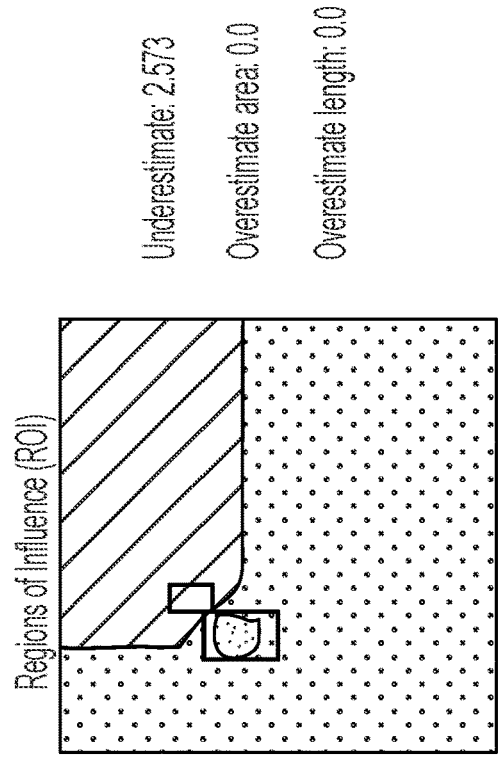
FIG. 9A illustrates an exemplary application of the neural network loss function of the process of FIG. 6 to a single region of influence in an image, according to one or more embodiments shown and described herein.
Figure 9A:
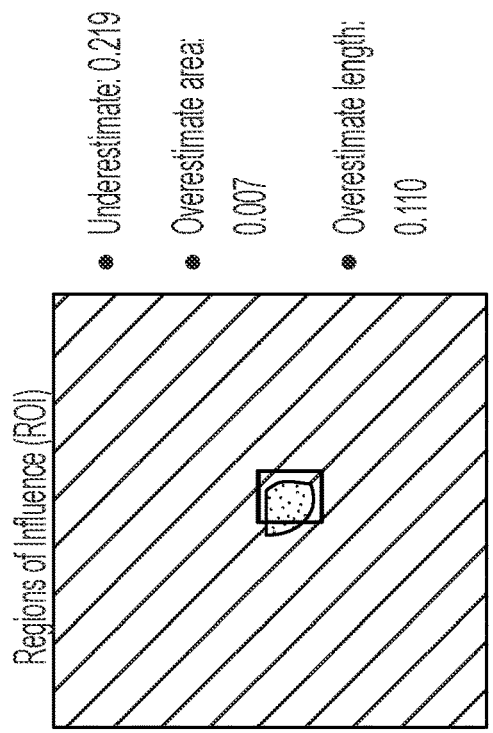
Figure 9B:
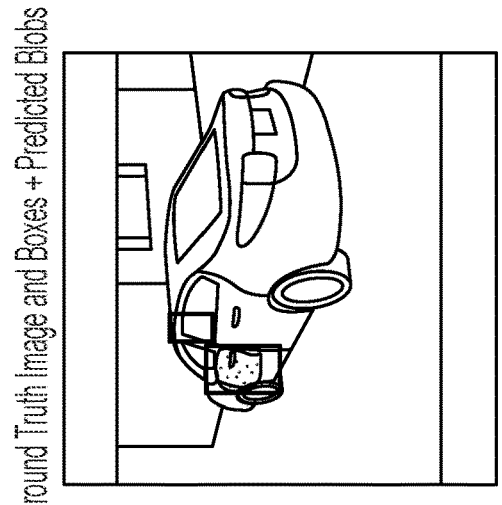
FIG. 9B illustrates an exemplary application of the neural network loss function of the process of FIG. 6 to dual regions of influence in an image, according to one or more embodiments shown and described herein.
Figure 9B:
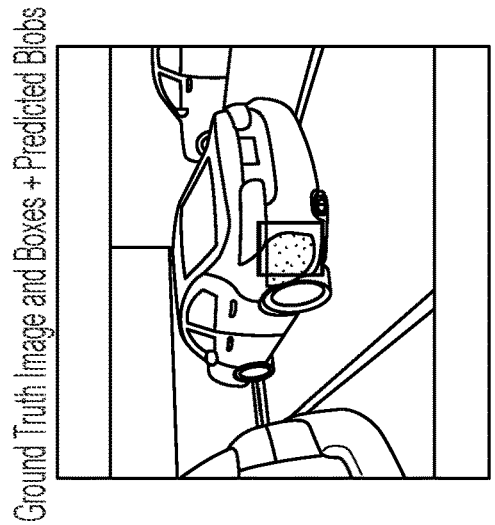

The loss score estimations as described herein may further be applied to an analyzed real image of a car for a single region of interest and for adjacent regions of interest, as shown respectively in FIGS. 9A-9B. Referring to FIG. 9A, an application 900A of the neural network loss function of the process 600 of FIG. 6 is shown with respect to a single region of influence in an image. In the application 900A, a mask is disposed about a predicted area of damage of the vehicle, and a boundary box is disposed about the mask in a single region of influence. The underestimated loss score of Equation 1 is 0.219, the overestimated area loss score of Equation 2 is 0.007, and the overestimated length loss score of Equation 3 is 0.110 to indicate the mask is not fully covered and surrounded by the boundary box in the single region of influence.

Referring to FIG. 9B, an application 900B of the neural network loss function of the process 600 of FIG. 6 is shown with respect to dual regions of influence in an image. In the application 900B, a pair of masks are disposed about a predicted areas of damage of the vehicle, and a pair of boundary boxes are disposed about the mask in dual regions of influence. The mask pixels in each of the dual regions of influence may be scored and compared against each other. The underestimated loss score of Equation 1 is 2.573, the overestimated area loss score of Equation 2 is 0.0, and the overestimated length loss score of Equation 3 is 0.0 to indicate the masks are fully covered and surrounded by the boundary boxes in the dual regions of influence but may not be generally tightly bound by the boundary boxes as in FIG. 9A with respect to the areas of damage. In embodiments, machine learning may be applied to the neural network model to calculate predictions on the neural network of a loss and to optimize a decrease of the loss over iterations.

In embodiments, the machine readable instructions may thus cause the intelligent prediction system 200 to, when executed by the processor 204, train an artificial intelligence component on a neural network model to analyze images of property damage to detect and predict property damage of a property, the neural network model during training configured to (1) switch between one or more synthetic images comprising pixel-based masked annotations of damaged property from a synthetic engine 720 and one or more real images comprising bounding box annotations of damaged property from a real database 710, and (2) freeze inactive class training to prevent learning on one or more inactive classes comprising one or more pre-determined missing annotated labels in the one or more synthetic images 722, the one or more real images 712, or combinations thereof. The neural network model may be configured to switch between one or more synthetic images 722 of damaged property and one or more real images 712 of damaged property at a ratio of 1:1 or 5:1, for example. The one or more synthetic images 722 may be partially or fully unlabeled, and the one or more real images 712 may be annotated with bounding boxes 714 around damaged parts to identify damaged areas.

Additionally or alternatively, the machine readable instructions may cause the intelligent prediction system 200 to, when executed by the processor 204, receive from a user one or more uploaded images 104 of at least a property, label each received image 104 as corresponding to at least one predetermined class, generate one or more boundary boxes 714, 814 (also referable to as bounding boxes), one or more overlapping pixel-based masks, or combinations thereof, that encapsulate areas of damage within the received and labeled images 104, and implement a modified loss function to optimize damaged area prediction and minimize error based on one or more pixel determinations associated with the one or more boundary boxes 714, 814 disposed about areas of damage of the received and labeled images 104. The modified loss function may include, as described herein with respect to FIGS. 8A-8C, one or more of an underestimate loss score based on length of a boundary box 814A and an overlapping mask 824A, an overestimate area loss score based on an area pixel determination of the boundary box 814B and the overlapping mask 824B, and an overestimate loss score based on length of the boundary box 814C and the overlapping mask 824C. As described with respective to FIGS. 9A-9B, the modified loss function may be configured to associate a predicted area of damage with a single region of influence (FIG. 9A) comprising a mask and an overlapping boundary box or with a pair of regions of influence (FIG. 9B), each region of influence comprising a mask and an overlapping boundary box.

As a non-limiting example, the automated property damage estimation determination may cause a scheduled inspection to be canceled and/or reduce the amount of time a vehicle is held at a garage, saving time and expenses related to the estimation process and leading to producing efficient results and a more accurate damage estimations.

Damage estimations associated with property, such as insured property, that are reported to an insurance company for processing may be numerous in volume, expensive to process, and may be an unpleasant experience for the parties involved. A manual damage estimation determination for an insurance claim may take longer than a week for a human specialist at an insurance company to determine. However, within the tools, systems, and methods described herein to automate one or more aspects of the property damage estimation determination process, this time frame can be significantly shortened for a large proportion of submitted insurance claims.

In embodiments, the intelligent prediction solution systems and methods as described herein assist to significantly reduce inefficiencies associated with claims processing and to reduce such volume by efficiently handling damage estimation determinations in a first instance to result in faster damage estimation identification, for example. As a non-limiting example, such requests may be received via application tools 226, such as through chats or digital interactions from a mobile or web-based application tool to provide a customized and personalized user experience independent of manual damage estimation determination process conducted by a human claims adjustor specialist. Further, the intelligent prediction solution systems and methods described herein may utilize relatively inexpensive and less sophisticated images of annotated property damage for training a neural network model to implement a more sophisticated automated property damage contouring with respect to an uploaded image and associated estimation determination. The intelligent prediction solution systems and methods provide a more efficient processing system to efficiently and automatically handle damage estimation determinations, effectively reducing a use of processing power while optimizing system usage and efficiencies, while further improving customer and/or user experience and lowering rental or storage costs associated with the insured property while shortening the time to produce related damage estimation determinations.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Aspects Listing:

Aspect 1. An intelligent prediction system includes one or more processors, one or more memory components communicatively coupled to the one or more processors, and machine readable instructions stored in the one or more memory components. The machine readable instructions cause the intelligent prediction system to perform at least the following when executed by the one or more processors: train a neural network model to analyze images of property damage to detect and predict property damage of a property, the neural network model during training configured to (1) switch between one or more synthetic images comprising pixel-based masked annotations of damaged property from a synthetic engine and one or more real images comprising bounding box annotations of damaged property from a real database. The machine readable instructions further cause the intelligent prediction system to perform at least the following when executed by the one or more processors: (2) freeze inactive class training to prevent learning on one or more inactive classes comprising one or more pre-determined missing annotated labels in the one or more synthetic images, the one or more real images, or combinations thereof.

Aspect 2. The intelligent prediction system of Aspect 1, wherein the neural network model is configured to switch between one or more synthetic images of damaged property and one or more real images of damaged property at a ratio of 1:1.

Aspect 3. The intelligent prediction system of Aspect 1, wherein the neural network model is configured to switch between one or more synthetic images of damaged property and one or more real images of damaged property at a ratio of 5:1.

Aspect 4. The intelligent prediction system of any of Aspect 1 to Aspect 3, wherein the one or more synthetic images are partially or fully unlabeled.

Aspect 5. The intelligent prediction system of any of Aspect 1 to Aspect 4, wherein the one or more real images are annotated with bounding boxes around damaged parts to identify damaged areas.

Aspect 6. The intelligent prediction system of any of Aspect 1 to Aspect 5, wherein the machine readable instructions further cause the intelligent prediction system to perform at least the following when executed by the one or more processors: receive from a user one or more uploaded images of at least a property, label each received image as corresponding to at least one predetermined class, generate one or more boundary boxes, one or more overlapping pixel-based masks, or combinations thereof that encapsulate areas of damage within the received and labeled images, and implement a modified loss function to optimize damaged area prediction and minimize error based on one or more pixel determinations associated with the one or more boundary boxes disposed about areas of damage of the received and labeled images.

Aspect 7. The intelligent prediction system of Aspect 6, wherein the modified loss function comprises one or more of an underestimate loss score based on length of a boundary box and an overlapping mask, an overestimate area loss score based on an area pixel determination of the boundary box and the overlapping mask, and an overestimate loss score based on length of the boundary box and the overlapping mask.

Aspect 8. The intelligent prediction system of any of Aspect 6 to Aspect 7, wherein the modified loss function is configured to associate a predicted area of damage with a single region of influence comprising a mask and an overlapping boundary box.

Aspect 9. The intelligent prediction system of any of Aspect 6 to Aspect 8, wherein the modified loss function is configured to associate a predicted area of damage with a pair of regions of influence, each region of influence comprising a mask and an overlapping boundary box.

Aspect 10. The intelligent prediction system of any of Aspect 1 to Aspect 9, wherein the machine readable instructions further cause the intelligent prediction system to perform at least the following when executed by the one or more processors: receive from a user one or more uploaded images of at least a property, identify each received image as corresponding to at least one predetermined class, identify a property part for each received image associated with the at least one predetermined class defining an exterior portion of the property, and identify, using the neural network model, an area of damage for each received image associated with the at least one predetermined class defining the exterior portion of the property. The machine readable instructions further cause the intelligent prediction system to perform at least the following when executed by the one or more processors: automatically define, using the neural network model, an overlap between a part mask associated with the identified property part and a damage mask associated with the identified area of damage for each received image associated with the at least one predetermined class defining the exterior portion of the property, generate an automatically annotated image based on the overlap in which an annotation is disposed to surround the overlap as a damaged part mask, identify, using the neural network model, a damaged property part based on the automatically annotated image and the damaged part mask, and generate an automated damage estimation determination based on the identified damaged property part.

Aspect 11. The intelligent prediction system of Aspect 10, wherein the property comprises a vehicle, the property part comprises a vehicle part, the at least one predetermined class comprises a predetermined vehicle class, the exterior portion of the property comprises the exterior portion of the vehicle, the identified property part comprises an identified vehicle part, and the damaged property part comprises a damaged vehicle part.

Aspect 12. The intelligent prediction system of Aspect 11, wherein the vehicle is an automotive vehicle.

Aspect 13. The intelligent prediction system of any of Aspect 6 to Aspect 12, wherein the one or more uploaded images comprise one of the following predetermined classes of the property: front, rear, driver side, passenger side, and interior.

Aspect 14. The intelligent prediction system of any of Aspect 6 to Aspect 13, wherein the one or more uploaded images are configured to be labeled based on one or more predetermined classes.

Aspect 15. The intelligent prediction system of any of Aspect 6 to Aspect 14, further including machine readable instructions that cause the intelligent prediction system to perform at least the following when executed by the one or more processors: score at least one region of interest of each of the identified received images for each corresponding at least one predetermined class, and determine whether a sufficient amount of identified received images are received for further processing by a data analytics module to generate the automated damage estimation determination based on the score.

Aspect 16. A method of implementing an intelligent prediction system to train a neural network model to analyze images of property damage to detect and predict property damage of a property, the method including via the neural network model, during training, switching between one or more synthetic images comprising pixel-based masked annotations of damaged property from a synthetic engine and one or more real images comprising bounding box annotations of damaged property from a real database. The method further includes freezing inactive class training to prevent learning on one or more inactive classes comprising one or more pre-determined missing annotated labels in the one or more synthetic images, the one or more real images, or combinations thereof.

Aspect 17. The method of Aspect 16, further including receiving from a user one or more uploaded images of at least a property, labeling each received image as corresponding to at least one predetermined class, generating one or more boundary boxes, one or more overlapping pixel-based masks, or combinations thereof that encapsulate areas of damage within the received and labeled images, and implementing a modified loss function to optimize damaged area prediction and minimize error based on one or more pixel determinations associated with the one or more boundary boxes disposed about areas of damage of the received and labeled images.

Aspect 18. The method of any of Aspect 16 to Aspect 17, further including receiving from a user one or more uploaded images of at least a property, identifying each received image as corresponding to at least one predetermined class, identifying a property part for each received image associated with the at least one predetermined class defining an exterior portion of the property, and identifying, using the neural network model, an area of damage for each received image associated with the at least one predetermined class defining the exterior portion of the property. The method further includes automatically defining, using the neural network model, an overlap between a part mask associated with the identified property part and a damage mask associated with the identified area of damage for each received image associated with the at least one predetermined class defining the exterior portion of the property, generating an automatically annotated image based on the overlap in which an annotation is disposed to surround the overlap as a damaged part mask, identifying, using the neural network model, a damaged property part based on the automatically annotated image and the damaged part mask, and generating an automated damage estimation determination based on the identified damaged property part.

Aspect 19. A method of implementing an intelligent prediction system to train a neural network model to analyze images of property damage to detect and predict property damage of a property, the method including via the neural network model, during training, switching between one or more synthetic images comprising pixel-based masked annotations of damaged property of one or more vehicles from a synthetic engine and one or more real images comprising bounding box annotations of damaged property of the one or more vehicles from a real database, and freezing inactive class training to prevent learning on one or more inactive classes comprising one or more pre-determined missing annotated labels in the one or more synthetic images, the one or more real images, or combinations thereof.

Aspect 20. The method of Aspect 19, further including receiving from a user one or more uploaded images of at least a damaged vehicle, labeling each received image as corresponding to at least one predetermined vehicle class, generating one or more boundary boxes, one or more overlapping pixel-based masks, or combinations thereof that encapsulate areas of damage within the received and labeled images of the damaged vehicle, and implementing a modified loss function to optimize damaged area prediction and minimize error based on one or more pixel determinations associated with the one or more boundary boxes disposed about areas of damage of the received and labeled images of the damaged vehicle.

What is claimed is:

1. An intelligent prediction system comprising:
one or more processors;
one or more memory components communicatively coupled to the one or more processors; and
machine readable instructions stored in the one or more memory components that cause the intelligent prediction system to perform at least the following when executed by the one or more processors:
train a neural network model to analyze images of property damage to detect and predict property damage of a property, the neural network model during training configured to (1) switch between one or more synthetic images comprising pixel-based masked annotations of damaged property from a synthetic engine and one or more real images comprising bounding box annotations of damaged property from a real database, and (2) freeze inactive class training to prevent learning on one or more inactive classes comprising one or more predetermined missing annotated labels in the one or more synthetic images, the one or more real images, or combinations thereof.

2. The intelligent prediction system of claim 1, wherein the neural network model is configured to switch between one or more synthetic images of damaged property and one or more real images of damaged property at a ratio of 1:1.

3. The intelligent prediction system of claim 1, wherein the neural network model is configured to switch between one or more synthetic images of damaged property and one or more real images of damaged property at a ratio of 5:1.

4. The intelligent prediction system of claim 1, wherein the one or more synthetic images are partially or fully unlabeled.

5. The intelligent prediction system of claim 1, wherein the one or more real images are annotated with bounding boxes around damaged parts to identify damaged areas.

6. The intelligent prediction system of claim 1, wherein the machine readable instructions further cause the intelligent prediction system to perform at least the following when executed by the one or more processors:
receive from a user one or more uploaded images of at least a property;
label each received image as corresponding to at least one predetermined class;
generate one or more boundary boxes, one or more overlapping pixel-based masks, or combinations thereof that encapsulate areas of damage within the received and labeled images; and
implement a modified loss function to optimize damaged area prediction and minimize error based on one or more pixel determinations associated with the one or more boundary boxes disposed about areas of damage of the received and labeled images.

7. The intelligent prediction system of claim 6, wherein the modified loss function comprises one or more of an underestimate loss score based on length of a boundary box and an overlapping mask, an overestimate area loss score based on an area pixel determination of the boundary box and the overlapping mask, and an overestimate loss score based on length of the boundary box and the overlapping mask.

8. The intelligent prediction system of claim 6, wherein the modified loss function is configured to associate a predicted area of damage with a single region of influence comprising a mask and an overlapping boundary box.

9. The intelligent prediction system of claim 6, wherein the modified loss function is configured to associate a predicted area of damage with a pair of regions of influence, each region of influence comprising a mask and an overlapping boundary box.

10. The intelligent prediction system of claim 1, wherein the machine readable instructions further cause the intelligent prediction system to perform at least the following when executed by the one or more processors:
receive from a user one or more uploaded images of at least a property;
identify each received image as corresponding to at least one predetermined class;
identify a property part for each received image associated with the at least one predetermined class defining an exterior portion of the property;
identify, using the neural network model, an area of damage for each received image associated with the at least one predetermined class defining the exterior portion of the property;
automatically define, using the neural network model, an overlap between a part mask associated with the identified property part and a damage mask associated with the identified area of damage for each received image associated with the at least one predetermined class defining the exterior portion of the property;
generate an automatically annotated image based on the overlap in which an annotation is disposed to surround the overlap as a damaged part mask;
identify, using the neural network model, a damaged property part based on the automatically annotated image and the damaged part mask; and
generate an automated damage estimation determination based on the identified damaged property part.

11. The intelligent prediction system of claim 10, wherein the property comprises a vehicle, the property part comprises a vehicle part, the at least one predetermined class comprises a predetermined vehicle class, the exterior portion of the property comprises the exterior portion of the vehicle, the identified property part comprises an identified vehicle part, and the damaged property part comprises a damaged vehicle part.

12. The intelligent prediction system of claim 11, wherein the vehicle is an automotive vehicle.

13. The intelligent prediction system of claim 10, wherein the one or more uploaded images comprise one of the following predetermined classes of the property: front, rear, driver side, passenger side, and interior.

14. The intelligent prediction system of claim 10, wherein the one or more uploaded images are configured to be labeled based on one or more predetermined classes.

15. The intelligent prediction system of claim 10, further comprising machine readable instructions that cause the intelligent prediction system to perform at least the following when executed by the one or more processors:
score at least one region of interest of each of the identified received images for each corresponding at least one predetermined class; and
determine whether a sufficient amount of identified received images are received for further processing by a data analytics module to generate the automated damage estimation determination based on the score.

16. A method of implementing an intelligent prediction system to train a neural network model to analyze images of property damage to detect and predict property damage of a property, the method comprising:
via the neural network model, during training, switching between one or more synthetic images comprising pixel-based masked annotations of damaged property from a synthetic engine and one or more real images comprising bounding box annotations of damaged property from a real database, and freezing inactive class training to prevent learning on one or more inactive classes comprising one or more predetermined missing annotated labels in the one or more synthetic images, the one or more real images, or combinations thereof.

17. The method of claim 16, further comprising:

receiving from a user one or more uploaded images of at least a property;

labeling each received image as corresponding to at least one predetermined class;

generating one or more boundary boxes, one or more overlapping pixel-based masks, or combinations thereof that encapsulate areas of damage within the received and labeled images; and implementing a modified loss function to optimize damaged area prediction and minimize error based on one or more pixel determinations associated with the one or more boundary boxes disposed about areas of damage of the received and labeled images.

18. The method of claim 16, further comprising:

receiving from a user one or more uploaded images of at least a property;

identifying each received image as corresponding to at least one predetermined class;

identifying a property part for each received image associated with the at least one predetermined class defining an exterior portion of the property;

identifying, using the neural network model, an area of damage for each received image associated with the at least one predetermined class defining the exterior portion of the property;

automatically defining, using the neural network model, an overlap between a part mask associated with the identified property part and a damage mask associated with the identified area of damage for each received image associated with the at least one predetermined class defining the exterior portion of the property;

generating an automatically annotated image based on the overlap in which an annotation is disposed to surround the overlap as a damaged part mask;

identifying, using the neural network model, a damaged property part based on the automatically annotated image and the damaged part mask; and generating an automated damage estimation determination based on the identified damaged property part.

19. A method of implementing an intelligent prediction system to train a neural network model to analyze images of property damage to detect and predict property damage of a property, the method comprising:

via the neural network model, during training, switching between one or more synthetic images comprising pixel-based masked annotations of damaged property of one or more vehicles from a synthetic engine and one or more real images comprising bounding box annotations of damaged property of the one or more vehicles from a real database, and freezing inactive class training to prevent learning on one or more inactive classes comprising one or more predetermined missing annotated labels in the one or more synthetic images, the one or more real images, or combinations thereof.

20. The method of claim 19, further comprising:

receiving from a user one or more uploaded images of at least a damaged vehicle;

labeling each received image as corresponding to at least one predetermined vehicle class;

generating one or more boundary boxes, one or more overlapping pixel-based masks, or combinations thereof that encapsulate areas of damage within the received and labeled images of the damaged vehicle; and implementing a modified loss function to optimize damaged area prediction and minimize error based on one or more pixel determinations associated with the one or more boundary boxes disposed about areas of damage of the received and labeled images of the damaged vehicle.

* * * * *